(12) United States Patent
Levesque et al.

(10) Patent No.: US 9,196,134 B2
(45) Date of Patent: Nov. 24, 2015

(54) METHOD AND APPARATUS FOR SIMULATING SURFACE FEATURES ON A USER INTERFACE WITH HAPTIC EFFECTS

(71) Applicant: IMMERSION CORPORATION, San Jose, CA (US)

(72) Inventors: Vincent Levesque, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 453 days.

(21) Appl. No.: 13/665,526

(22) Filed: Oct. 31, 2012

(65) Prior Publication Data

US 2014/0118127 A1 May 1, 2014

(51) Int. Cl.
*G08B 6/00* (2006.01)
*G06F 3/01* (2006.01)
*G06F 3/041* (2006.01)

(52) U.S. Cl.
CPC *G08B 6/00* (2013.01); *G06F 3/016* (2013.01); *G06F 3/0416* (2013.01); *G06F 2203/04809* (2013.01)

(58) Field of Classification Search
CPC . G06F 3/041; G06F 3/03547; G06F 3/03548; G06F 3/0414; G06F 3/0416
USPC ............... 340/407.2, 384.6, 4.12, 7.6, 407.1; 345/173
See application file for complete search history.

(56) References Cited

U.S. PATENT DOCUMENTS

| | | | |
|---|---|---|---|
| 6,046,726 A * | 4/2000 | Keyson | 345/156 |
| 7,088,342 B2 | 8/2006 | Rekimoto et al. | |
| 7,205,978 B2 | 4/2007 | Poupyrev et al. | |
| 7,446,456 B2 | 11/2008 | Maruyama et al. | |
| 7,456,823 B2 | 11/2008 | Poupyrev et al. | |
| 7,554,246 B2 | 6/2009 | Maruyama et al. | |
| 7,663,604 B2 | 2/2010 | Maruyama et al. | |
| 7,755,607 B2 | 7/2010 | Poupyrev et al. | |
| 7,924,144 B2 | 4/2011 | Makinen et al. | |
| 7,982,588 B2 | 7/2011 | Makinen et al. | |
| 8,026,798 B2 | 9/2011 | Makinen et al. | |
| 8,279,193 B1 | 10/2012 | Birnbaum et al. | |
| 2008/0088580 A1 | 4/2008 | Poupyrev et al. | |
| 2010/0085169 A1 | 4/2010 | Poupyrev et al. | |
| 2010/0325931 A1 * | 12/2010 | Rosenberg | 42/1.08 |

(Continued)

OTHER PUBLICATIONS

Extended Search Report, including the Search Opinion, issued for European Patent Application No. 13191210.7, dated May 16, 2014.

*Primary Examiner* — Phung Nguyen
(74) *Attorney, Agent, or Firm* — Pillsbury Winthrop Shaw Pittman LLP

(57) ABSTRACT

A haptic effect enabled device for simulating a tactile sensation on a surface. In some cases, the haptic effect enabled device may be a user interface device, and the tactile sensation may be simulated on a surface of the user interface device. The interface device may include a haptic output device configured to generate a haptic effect, such as a periodic haptic effect, at the surface. The interface device may include a drive module configured to generate a periodic drive signal based on a touch input at the surface of the interface device and based on the tactile sensation to be simulated at the surface. The interface device may include a drive circuit operatively coupled to the drive module and the haptic output device and configured to apply the periodic drive signal to the haptic output device. In some cases, the surface may be separate from the device.

16 Claims, 14 Drawing Sheets

(56) References Cited

U.S. PATENT DOCUMENTS

| | | | |
|---|---|---|---|
| 2011/0285666 A1* | 11/2011 | Poupyrev et al. | 345/174 |
| 2012/0026180 A1 | 2/2012 | Kuchenbecker et al. | |
| 2012/0217978 A1* | 8/2012 | Shen et al. | 324/601 |
| 2012/0229400 A1 | 9/2012 | Birnbaum et al. | |
| 2012/0268412 A1 | 10/2012 | Cruz-Hernandez et al. | |
| 2012/0327006 A1* | 12/2012 | Israr et al. | 345/173 |

\* cited by examiner

METHOD AND APPARATUS FOR SIMULATING SURFACE FEATURES ON A USER INTERFACE WITH HAPTIC EFFECTS

FIELD OF THE INVENTION

The invention relates to a method and apparatus for simulating surface features on a user interface with haptic effects.

BACKGROUND OF THE INVENTION

Some electronic user interface devices are able to generate a haptic effect to indicate presence of features represented on the user interface devices. If an electronic user interface device has a touch interface, presence of the haptic effect may indicate the feature has been touched by a user, while absence of the haptic effect may indicate the feature has not been touched. Other details of the feature, such as its texture, may be conveyed to the user visually. A fixed periodic haptic effect has been generally described as a way to convey additional details of a feature to the user. Overall, however, the ability to convey feature details to users through haptic effects is still limited.

SUMMARY

According to an aspect of the present invention, there is provided a method for producing a haptic effect. The method may include generating a periodic drive signal based on a touch input at a surface and based on a tactile sensation to be simulated at the surface. The periodic drive signal may be applied to a haptic output device.

In an embodiment, the surface may be a surface of an interface device and the haptic output device may be coupled to the surface. In an embodiment, the haptic output device may be configured to generate electrostatic friction. The generation of the periodic drive signal may include altering an amplitude, frequency, or wave shape of the periodic drive signal to alter a level of friction at the surface of the interface device. The alteration of the signal may be based on a location, velocity, acceleration, pressure, or contact area of the touch input.

In an embodiment, an amplitude, frequency, or wave shape of a periodic drive signal may be altered based on a simulated transition between a first simulated region represented on the surface of the interface device and a second simulated region represented on the surface of the interface device. In an embodiment, the simulated transition may comprise movement over a simulated edge of the first simulated region or of the second simulated region. In some instances, the amplitude, frequency, or wave shape may be altered when the location of the touch input is substantially at the edge.

In an embodiment, the periodic drive signal may be based on a texture to be simulated at the surface of the interface device. In some instances, the texture may comprise a grating or mesh texture at the surface of the interface device. The grating may include, for example, a plurality of edges. In some instances, the generation of the periodic drive signal may comprise altering the frequency of the drive signal based on spacing among the plurality of edges of the grating or mesh and based on a velocity of the touch input at the surface. In some instances, the texture may comprise a stick-slip texture at the surface of the interface device, where generating the periodic drive signal may comprise temporarily suspending the periodic drive signal to simulate a slippery texture at the surface of the interface device.

In an embodiment, a frequency or amplitude of the periodic drive signal may be altered by a pseudo-random amount.

In an embodiment, the method may include generating two periodic drive signals that have different frequencies.

In an embodiment, recorded contact dynamics of an object that moved across another surface may be received. The periodic drive signal may be generated based on the recorded contact dynamics.

According to an aspect of the present invention, there is provided a haptic effect enabled device that comprises a haptic output device, a drive module, and a drive circuit. The drive module may be configured to generate a periodic drive signal based on a touch input at a surface and based on a tactile sensation to be simulated at the surface. The drive circuit may be operatively coupled to the drive module and the haptic output device and configured to apply the periodic drive signal to the haptic output device.

In an embodiment, the haptic effect enabled device may be an interface device, and the surface may be a surface of the interface device. In an embodiment, the haptic output device may be configured to generate electrostatic friction. In the embodiment, the drive module may be configured to generate the periodic drive signal by altering an amplitude, frequency, or wave shape of the periodic drive signal to alter a level of friction at the surface of the interface device. The alteration may be based on a location, velocity, acceleration, pressure, or contact area of the touch input.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
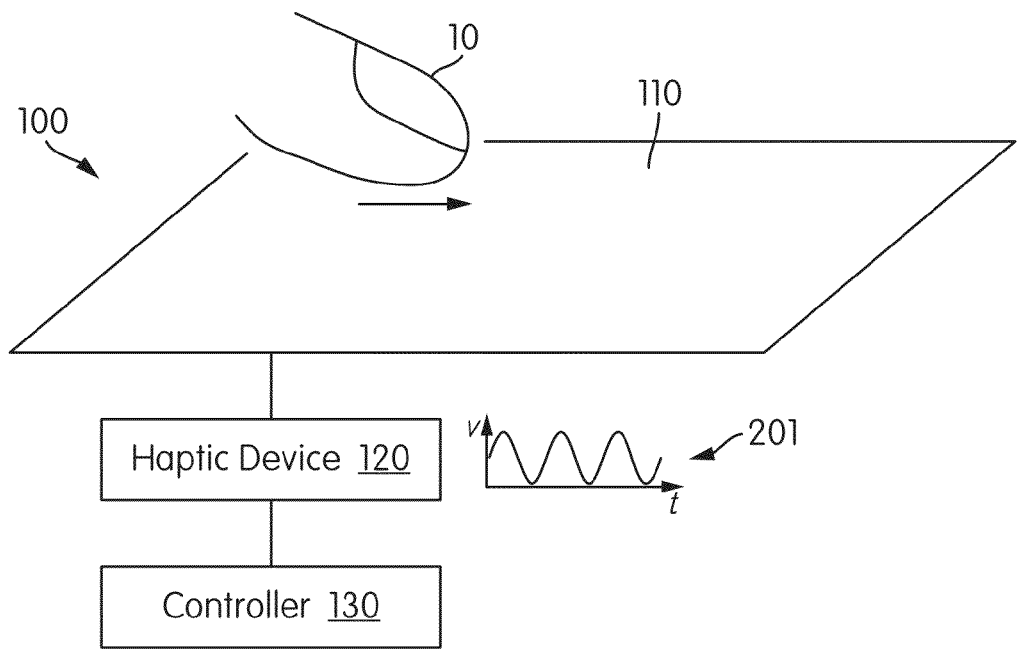
FIGS. 1A-1B schematically illustrate an apparatus in accordance with an embodiment of the invention.

FIG. 1A illustrates an embodiment of a haptic effect enabled user interface device 100 that may generate a haptic effect at a surface 110 of the device. The haptic effect may be generated to simulate a feature, such as a surface feature, represented by device 100. For example, the simulated surface feature may be a simulated texture, spatial pattern, edge or border, or any other tactile sensation, whether natural or artificial, of surface 110. In an embodiment, surface 110 may be a touch screen that displays an image corresponding to the simulated surface feature, such as an image of an object having the simulated texture or other tactile sensation. In an embodiment, surface 110 may be a touch pad that corresponds to a display of the image, or any other touch interface.

Device 100 may include a mobile phone, tablet computer, electronic display, touch pad, or any other electronic user interface device.

In an embodiment, device 100 may comprise a haptic drive module (e.g., controller 130), a haptic output device 120 to generate haptic effects, and a drive circuit operatively coupled to the controller 130 and the haptic output device 120 so as to apply a drive signal to the haptic output device. Controller 130 may include one or more processors or any other processing unit. Haptic output device 120 may include an actuator (e.g., a voice coil, ultrasonic vibration device, solenoid, piezoelectric device, or any other actuator), an electrostatic device, or any other haptic output device. The ultrasonic vibration device may, in some instances, reduce a level of friction at surface 110. Controller 130 may be operatively coupled to haptic device 120, which may be operatively coupled to surface 110. Haptic output devices are discussed in more detail in U.S. patent application Ser. No. 13/092,269, titled "Electro-vibrotactile Display," filed Apr. 22, 2011, the entire content of which is incorporated by reference herein.

In an embodiment, controller 130 and haptic device 120 may simulate surface features at surface 110 by controlling a level of friction. For example, a haptic device 120 that includes an actuator may control friction through generating vibrations at surface 110. A haptic device 120 that includes an electrostatic device may control a level of friction through applying a voltage to or underneath surface 110. An alternating voltage signal, for example, may create a capacitive effect that attracts finger 10, a stylus, or any other object at surface 110. The attractive force at the surface may be perceived as friction as the object moves across the surface. Increasing the attractive force may increase a level of friction at the surface. Controlling friction through a haptic effect is discussed in more detail in U.S. patent application Ser. No. 13/092,269, which was incorporated by reference above.

As described in that application, an electrostatic device may, in an embodiment, be used with a surface 110 that includes a conductive layer having one or more electrodes and that includes an insulating layer. The conducting layer may be any semiconductor or other conductive material. The insulating layer may be glass, plastic (e.g., thermoplastic), polymer, or any other insulating layer. The electrostatic device may operate by applying an AC signal that, in an embodiment, capacitively couples the conducting layer with an object near or touching surface 110. The AC signal may be generated by a high-voltage amplifier.

The capacitive coupling may control a level of friction on the surface 110. In an embodiment, a texture may be simulated by controlling the level of friction on the surface 110. Varying the levels of attraction between the object and the conducting layer can vary the friction on an object moving across the surface 110. Varying the friction force may simulate one or more textures.

Further, the capacitive coupling may also generate a haptic effect by stimulating parts of the object near or touching the surface 110, such as mechanoreceptors in the skin of a user's finger. In an example, the conducting layer can be applied with an AC voltage signal that couples with conductive parts of a user's finger. As the user moves his or her finger on the screen, the user may sense a texture of prickliness, graininess, bumpiness, roughness, stickiness, or some other texture.

In an embodiment, surface 110 does not have an insulating layer, so that an object can directly touch the conducting layer. A haptic effect can be generated by applying a voltage from the conducting layer to the object through an electrically conductive path. This embodiment may alternatively use an insulating layer, but include one or more electrodes in the insulating layer that can create an electrically conductive path from the conducting layer to objects that touch the electrode as they move across the insulating layer.

In an embodiment, a haptic effect is not confined to a surface (e.g., surface 110) of an electronic user interface device. In the embodiment, a user's hand, for example, may touch objects beyond a touch screen or touchpad and still perceive a haptic effect. The haptic effect may be generated by, for example, applying a voltage directly to the user's body from a signal generator or any other voltage-generating device. In some instances, the voltage-generating device may be a standalone device adapted to be mounted at a location that frequently comes into contact with the user's body. The voltage may be applied whenever a sensor detects that the user's body is touching an object on which a texture is to be simulated. The voltage may place charge on the user's body. Capacitive interaction between the charge on the user's body and the object being touched may create an attractive force between the user's body and the object. The force of attraction may control a level of friction at a surface of the object, which may simulate a texture or any other tactile sensation of the object being touched. Varying the voltage being applied to the user's body may vary the haptic effect, and thus vary the tactile sensation being simulated. If the voltage is based on a periodic signal, varying the voltage may include varying the amplitude or frequency of the signal. In some instances, the object may have a conductive layer surrounded by an insulating layer. The capacitive interaction may be between the conductive layer and the charge on the user's body. In some instances, both the object being touched and the voltage generating device may have a common ground. In some instances, the user's body may be grounded. In some instances, the user's body is not grounded.

In an embodiment, a user may perceive a simulated texture on an object both through an electrostatic effect that is generated at a surface of the object and through an augmented reality experience created by an electronic user interface device. For example, the electronic user interface device may create an augmented reality experience by displaying a captured image of an object and overlaying a graphical representation of a texture on the image. In the embodiment, the user may perceive a texture on an object both by touching the object and by seeing the graphical representation of the texture overlaid on the object on the electronic user interface.

In an embodiment, controller 130 may be configured to cause haptic device 120 to generate a periodic haptic effect. FIG. 1A, for example, illustrates a periodic haptic effect based on haptic drive signal 201. In some instances, a haptic drive signal may be a periodic drive signal. In some instances, haptic drive signals may represent haptic effects generated by haptic output devices. For example, if haptic output device 120 includes an electrostatic device, a haptic effect based on haptic drive signal 201 may include a sinusoidal AC voltage that has a frequency and amplitude matching or proportional to haptic drive signal 201. If haptic output device 120 includes an actuator, a haptic effect based on haptic drive signal 201 may include a vibration that that has a frequency and amplitude matching haptic drive signal 201. The periodic haptic effect may vary according to a sinusoidal waveform, as illustrated in FIG. 1A, a square, triangular, or sawtooth waveform, or any other periodic waveform. For example, a periodic electrostatic effect may be generated by an AC voltage having a sinusoidal, square, triangular, sawtooth, or any other waveform.

Figure 1B:
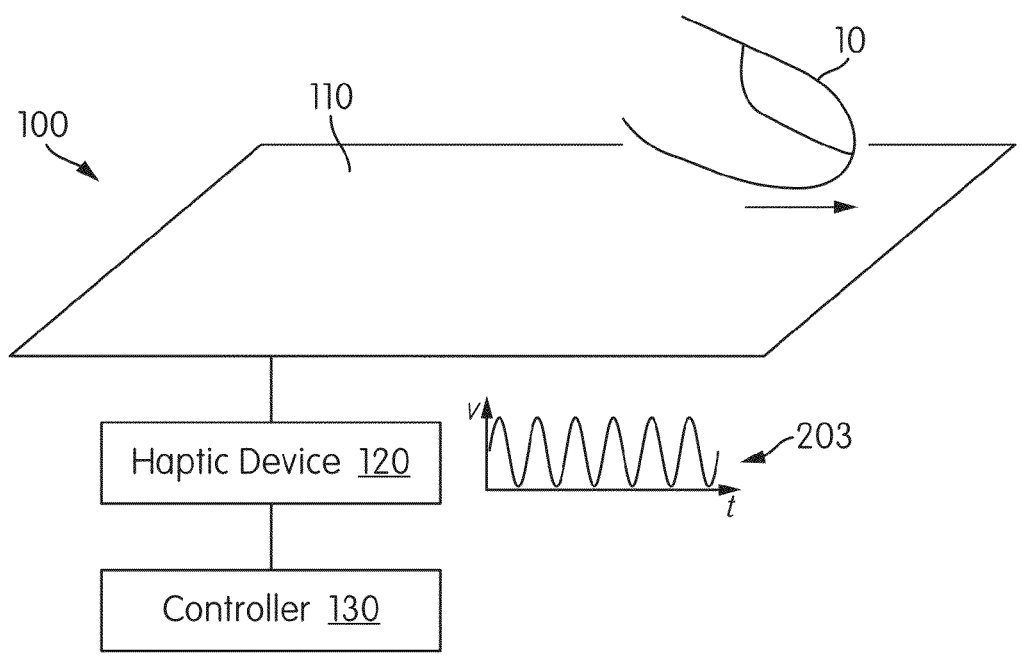

In an embodiment, controller 130 may cause haptic device 120 to alter the haptic effect. FIGS. 1A-1B illustrate, for example, altering a frequency of a periodic haptic effect as finger 10 or any other object creating a touch input moves across surface 110. For example, as illustrated in FIG. 1B, a haptic drive signal 203 may be altered so that haptic drive signal 203 has a greater frequency as compared to haptic drive signal 201 of FIG. 1A. In an embodiment, how the haptic effect changes may be based on a location, velocity, acceleration, direction of movement, applied pressure, lateral force, contact area, shape of contact area, angle of approach, orientation, temperature, conductance, or dryness of the object, or based on a system input. In an embodiment where there are simultaneous touch inputs, such as on a multi-touch device, how the haptic effect changes may be based on a parameter of any one of the touch inputs or any combination of the touch inputs.

Figure 2:
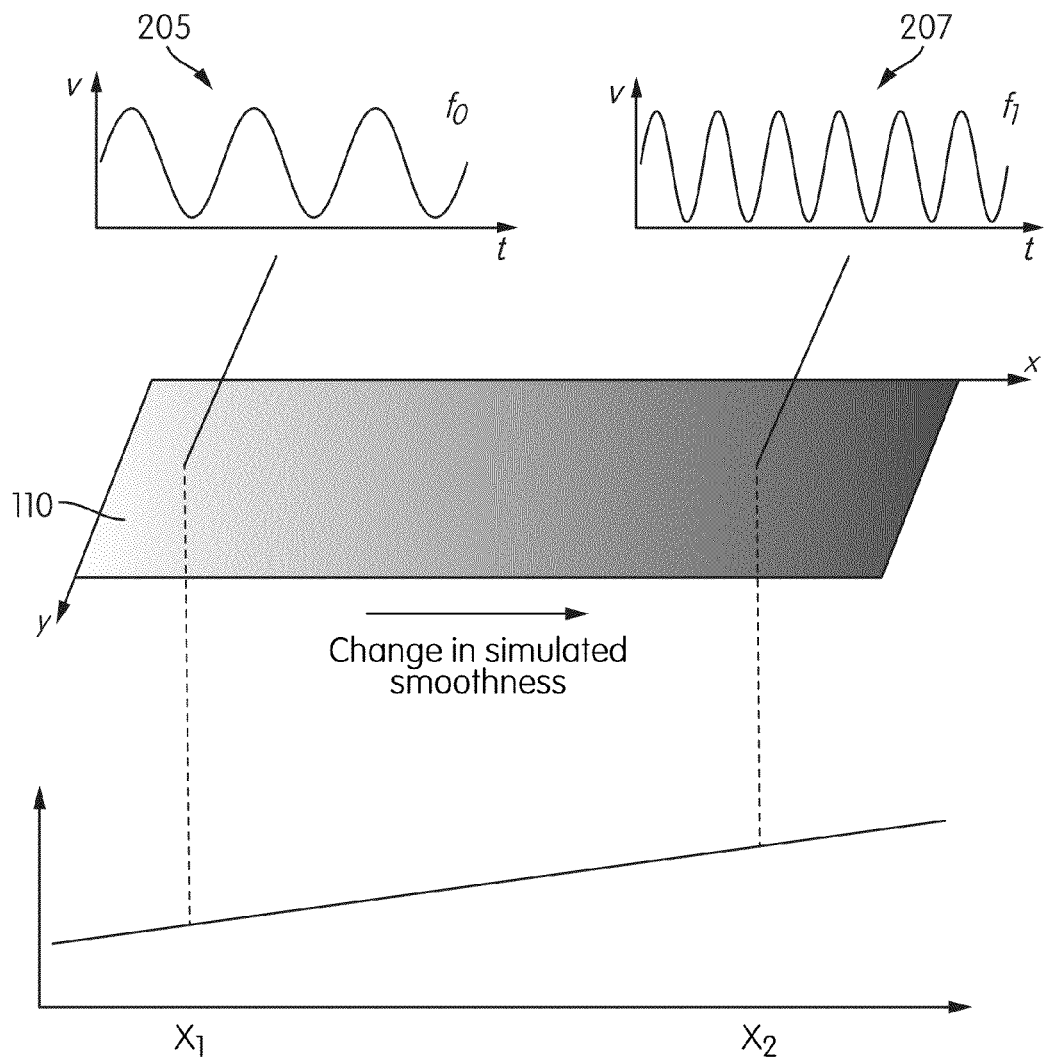
FIG. 2 schematically illustrates the apparatus of FIG. 1A altering a haptic effect generated at the apparatus's surface.

In an embodiment, a haptic effect may be altered in a continuous manner. For example FIG. 2 illustrates a periodic haptic effect that is based on haptic drive signals 205 and 207 and that are altered in frequency (from $f_0$ to $f_1$) as a touch input on surface 110 moves from position $x_1$ to position $x_2$. In the embodiment, the frequency of the periodic haptic effect may be increased linearly, as a function of location. In another embodiment, the frequency, amplitude of driving voltage V, phase, or any other characteristic of the periodic haptic effect may be altered based on any other continuous function to create a continuous gradient in the characteristic across surface 110. The function may be a function of location, time, or any combination thereof. The location or time may be determined by a controller such as controller 130.

In an embodiment, the continuous gradient in the periodic haptic effect as an object moves across surface 110 may simulate a gradient in texture or any other surface feature. For example, as the object moves across surface 110, the alteration in the periodic haptic effect may simulate a gradient in smoothness, roughness, stickiness, or any other texture. In an embodiment, the alteration in the periodic haptic effect may simulate a gradually increasing resistance, such as that from a spring or any other elastic force. In some instances, an image of a spring or other elastic object may be displayed on surface 110. The periodic haptic effect may simulate a resistance that corresponds with visually displayed stretching of the elastic object.

Figure 3A:
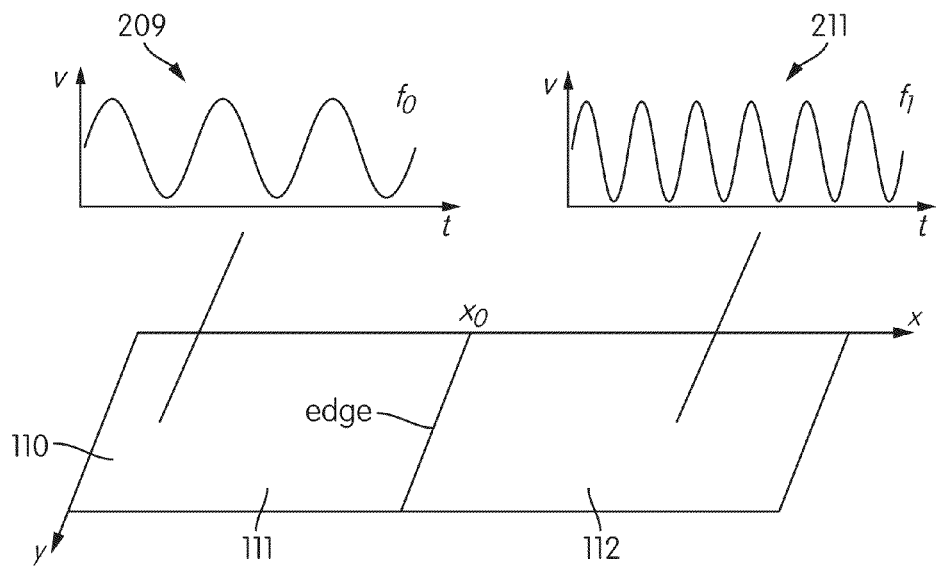
FIGS. 3A-3C schematically illustrate the apparatus of FIG. 1A altering a haptic effect generated at regions simulated on the apparatus's surface.

In an embodiment, a haptic effect may be altered in a discrete manner. For example, as illustrated in FIG. 3A, a haptic effect may be altered to simulate discrete regions on surface 110, such as regions 111 and 112. When an object is detected to be creating a touch input in region 111, a periodic haptic effect based on haptic drive signal 209 may be generated. When the object is detected to have moved into region 112, a frequency of the periodic haptic effect may be increased by a discrete amount. The altered periodic haptic effect is based on haptic drive signal 211.

Figure 3B:
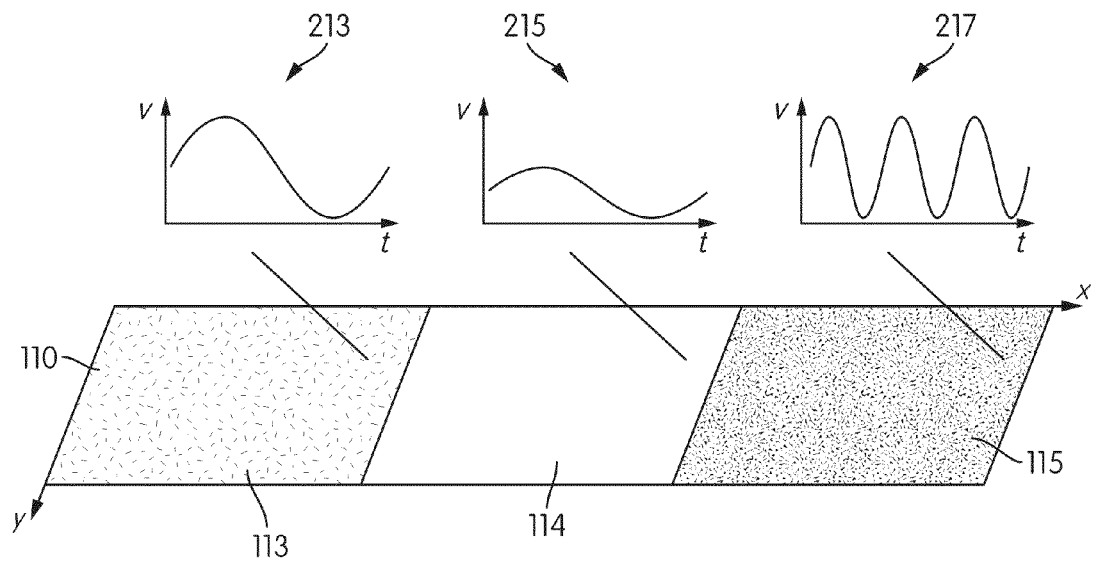

In an embodiment, altering a haptic effect in a discrete manner may simulate discrete regions of different textures on surface 110. For example, FIG. 3B illustrates three discrete regions that simulate three different textures. When an object is detected to be touching region 113, a periodic haptic effect having a frequency and amplitude represented by haptic drive signal 213 may be generated. The periodic haptic effect may simulate a first level of surface roughness. When the object is detected to have moved into region 114, an amplitude of the periodic haptic effect may be decreased by a discrete amount. The altered periodic haptic effect, based on haptic drive signal 215, may simulate a second level of surface roughness. When the object is detected to have moved into region 115, the amplitude and frequency of the periodic haptic effect may be increased by a discrete amount. The altered periodic haptic effect, based on haptic drive signal 217, may simulate a third level of surface roughness. In an embodiment, visual representations of the textures may be presented on surface 110. For example, images of coarse surfaces may be presented at regions 113 and 115 of surface 110.

Figure 3C:
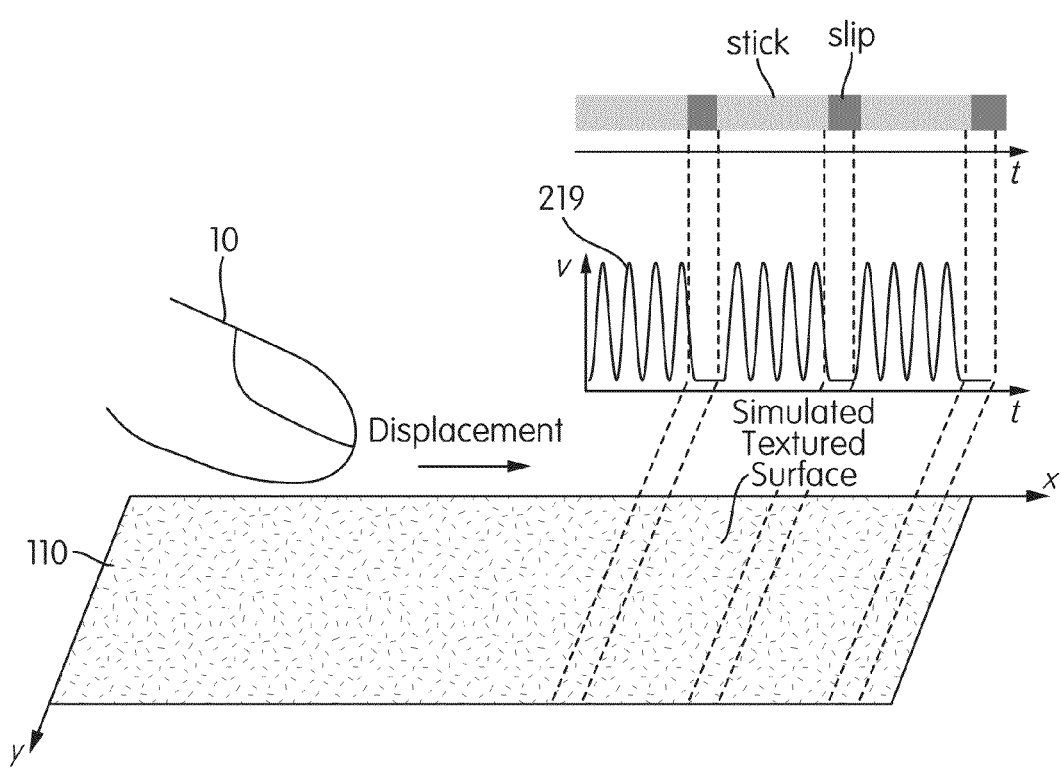

In an embodiment, a periodic haptic effect may be suspended at one or more regions on surface 110. FIG. 3C, for example, illustrates generating a haptic effect, which is based on haptic drive signal 219, to simulate a stick-slip texture on surface 110. In the example, the periodic haptic effect may be generated to represent one or more regions that stick to finger 10 or that more generally have a higher level of friction. Further in the example, the periodic haptic effect may be suspended to represent one or more regions where finger 10 slides across more easily or that more generally does not have as high of a level of friction.

Figure 4:
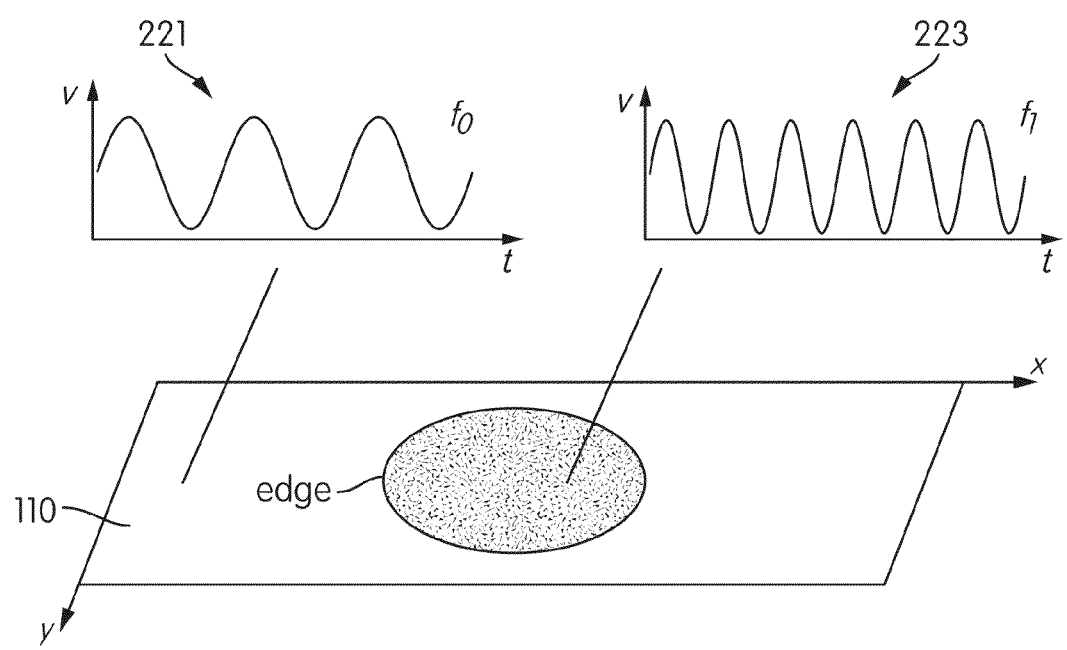
FIG. 4 schematically illustrates the apparatus of FIG. 1A altering a haptic effect generated at regions simulated on the apparatus's surface.

In an embodiment, a simulated region may have any shape, and may extend in one or more dimensions. FIG. 4, for example, illustrates a region extending in two dimensions and having an elliptical shape. When an object is detected to be crossing into the region, a periodic haptic effect being generated may be altered from a haptic effect based on haptic drive signal 221 to one based on haptic drive signal 223. When the object is detected to be crossing out of the region, the periodic haptic effect being generated may be altered in an opposite manner.

In an embodiment, a periodic haptic effect may be generated to create a pleasant or unpleasant sensation, or more generally a sensation having a psychological association, for a user touching surface 110. For example, the user may perceive a periodic haptic effect with a low frequency as pleasant and a periodic haptic effect with a high frequency as unpleasant. In an embodiment, the periodic haptic effect may be associated with an event displayed on surface 110. For example, the event may be losing a game displayed on surface 110 or attempting to perform an action on device 100 that is prohibited. When the event occurs, the haptic effect may be generated to create an unpleasant sensation for the user.

Figure 5:
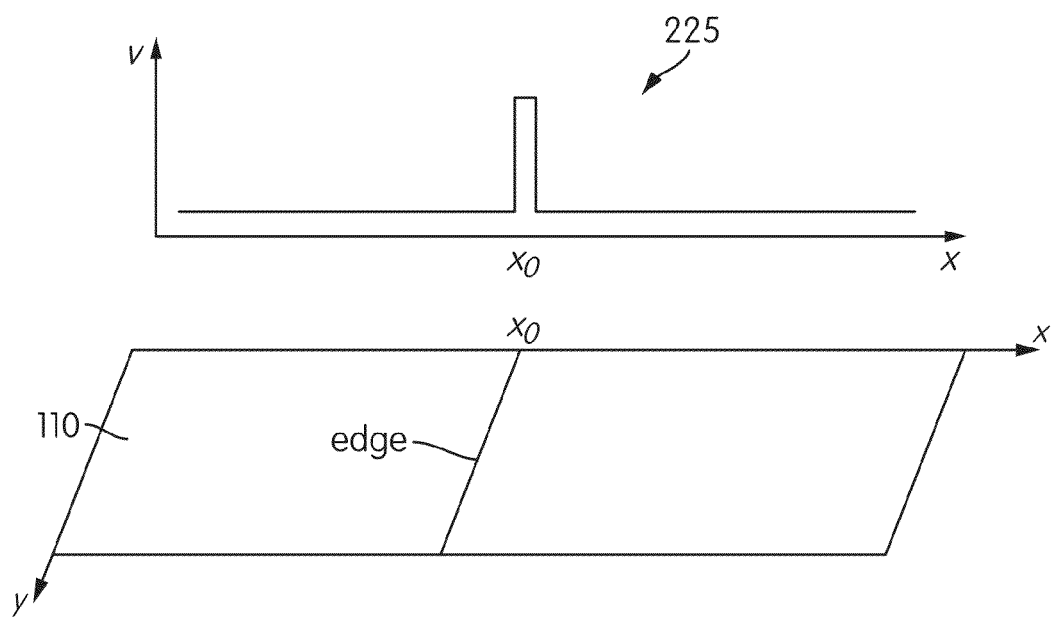
FIG. 5 schematically illustrates the apparatus of FIG. 1A simulating an edge on the apparatus's surface.

In an embodiment, a haptic effect that is localized in time or space (e.g., a brief, abrupt pulse) may be generated to simulate an edge or detent. For example, FIG. 5 illustrates a localized haptic effect based on impulse signal 225. As an object is detected to be at or to cross $x_0$ on surface 110, the haptic effect may be generated to simulate crossing of an edge or detent located at $x_0$. The localized haptic effect may cease once the object moves away from $x_0$ or after a predetermined amount of time has passed since the object passed position $x_0$. For example, a haptic effect may last for 20 msec after the object passes position $x_0$.

In an embodiment, the haptic effect may be based on a direction of movement. For example, a localized haptic effect may be more intense if a touch input is moving in a particular direction. The haptic effect may simulate directional textures such as fish scales, or other directional features, such as detents (e.g., in a ratchet).

In an embodiment, the described haptic effects may be part of an interface metaphor. For example, the different regions being simulated by altering a haptic effect may represent different file folders, workspaces, windows, or any other metaphor used in a computing environment. In the interface metaphor, dragging an element on surface 110 may be guided by friction created from a haptic effect. A level of friction being generated by the haptic effect may, for example, indicate how close the dragged element is to a target location.

Figure 6A:
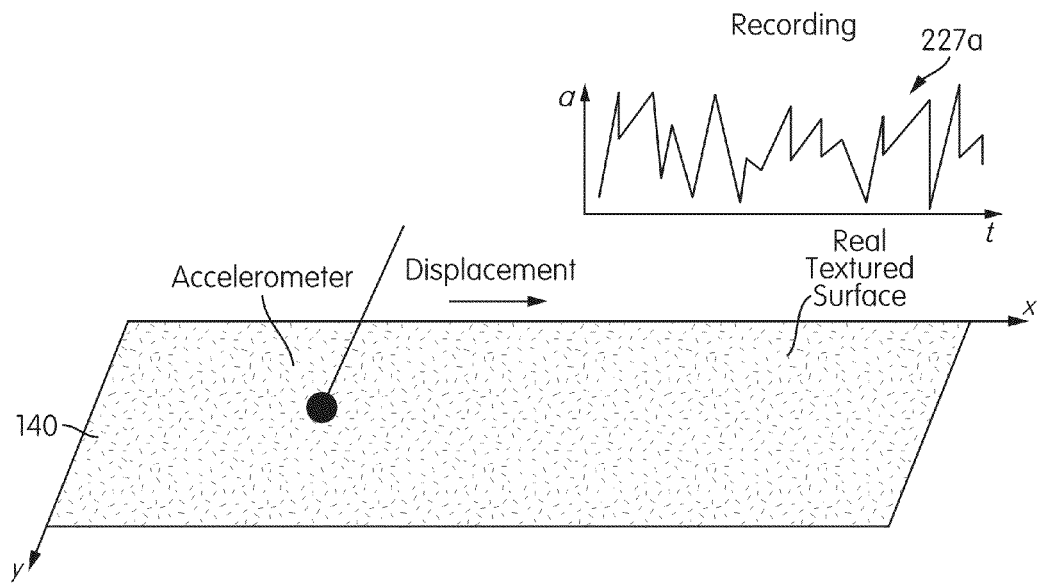
FIGS. 6A-6B schematically illustrate the apparatus of FIG. 1A generating a haptic effect on its surface based on signals recorded from sensing of another surface.
Figure 6B:
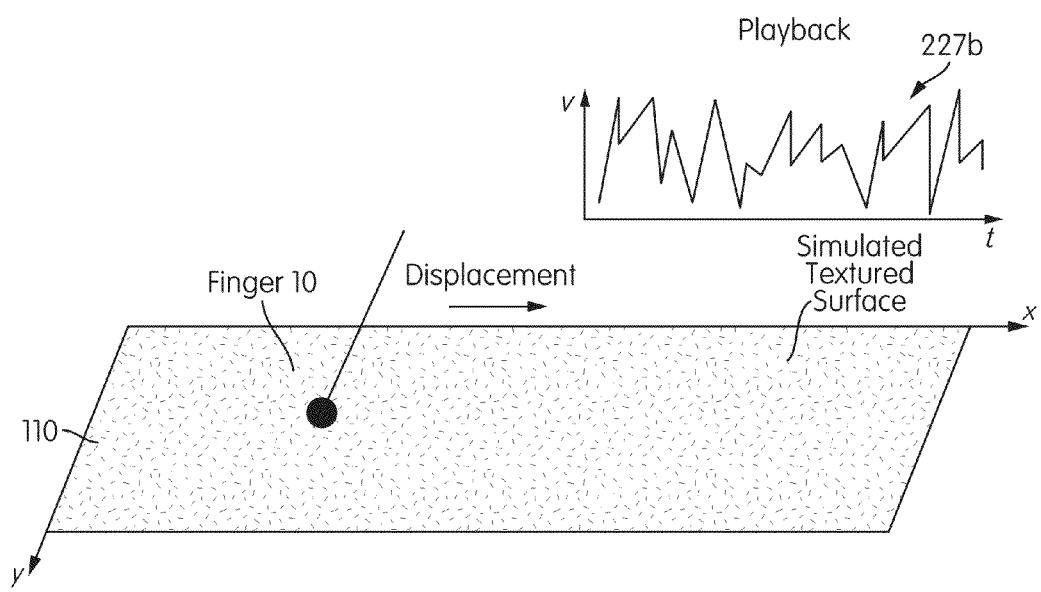

In an embodiment, a haptic effect generated at a surface may be based on measurements obtained from another surface. For example, to characterize the other surface, a probe may move across the other surface and measure acceleration or velocity of the probe, sound generated from the movement, any other contact dynamics measurement, light reflection off of the surface, or any other physical quantity. For example, FIG. 6A illustrates signal 227*a*, which captures acceleration of a probe as it moves across surface 140. The acceleration may be measured by an accelerometer, a camera, or any other sensor. In an embodiment, values of signal 227*a* that indicate low accelerations or velocities of the probe may correspond with a region on surface 140 that has a high coefficient of friction (e.g., a rough region), while values of signal 227*a* that indicate high accelerations or velocities of the probe may correspond with a region that has a low coefficient of friction (e.g., a smooth region). A haptic effect may reproduce or substantially reproduce surface features of surface 140 by playing back signal 227*a*, which captures measurements of surface 140. For example, the haptic effect may be based on a signal, illustrated as 227*b*, that is identical or substantially identical to signal 227*a*. The haptic effect at surface 110 may thus mimic texture or other tactile features of surface 140. In some instances, signal 227*b* may be further processed before a haptic effect is generated based on the signal. The processed signal 227*b* may be less identical to signal 227*a*.

In an embodiment, a rate of play back of signal 227*a* may be based on speed of movement of an object at surface 110 relative to speed of movement of the probe that measured surface 140. For example, if finger 10 moves more quickly than the probe moved across surface 140, signal 227*b* may be a compressed version of signal 227*a* in the time domain. If finger 10 moves more slowly than the probe moved across surface 140, signal 227*b* may be an expanded version of signal 227*a* in the time domain. Compressing or expanding signal 227*a* in the time domain may preserve a spatial distance over a surface feature is reproduced. For example, if the probe measured 1 cm of surface 140 in 1 second, the measured signal should be played back in 0.5 seconds for a finger moving at 2 cm/sec on surface 110. Compressing the measured signal in the time domain ensures that the reproduced surface features still occupies 1 cm of space on surface 110.

Figure 7A:
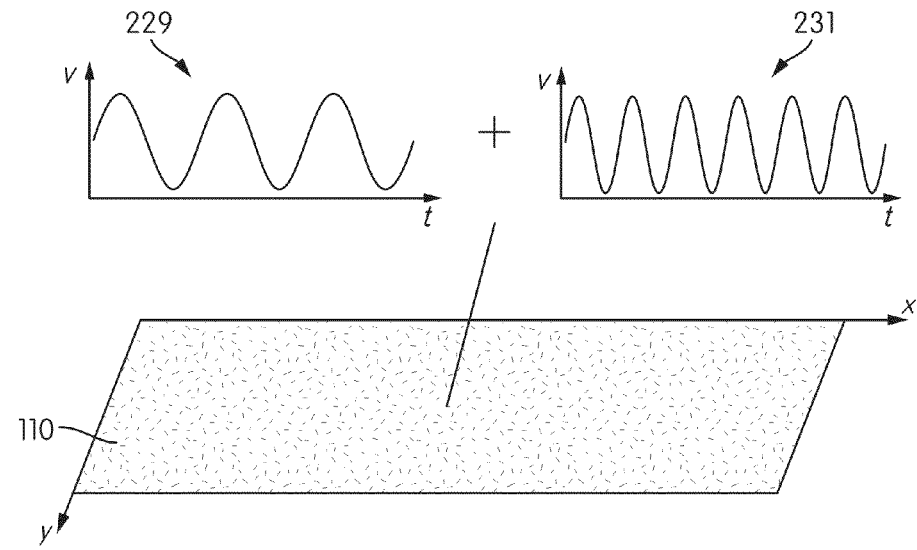
FIGS. 7A-7B schematically illustrates the apparatus of FIG. 1A combining haptic drive signals to generate a haptic effect.

In an embodiment, a haptic effect may be based on a combination of one or more haptic drive signals. Two signals may be combined through superposition, modulation (e.g., amplitude or frequency modulation), convolution, or any other combination. The combination of one or more haptic drive signals may include a discrete signal, a continuous signal, or any combination thereof. FIG. 7A illustrates a haptic effect that may be generated based on a superposition of haptic drive signals 229 and 231. In an embodiment, the haptic effect may be generated by generating two haptic effects, such as by causing one haptic output device to generate a haptic effect based on signal 229 and another haptic output device to generate a haptic effect based on signal 231. A user may perceive a combination of the two haptic effects as a single haptic effect. In an embodiment, the haptic effect may be generated by first calculating a combination of haptic drive signals 229 and 231, such as by controller 130, and generating a haptic effect based on the calculated combination.

Figure 7B:
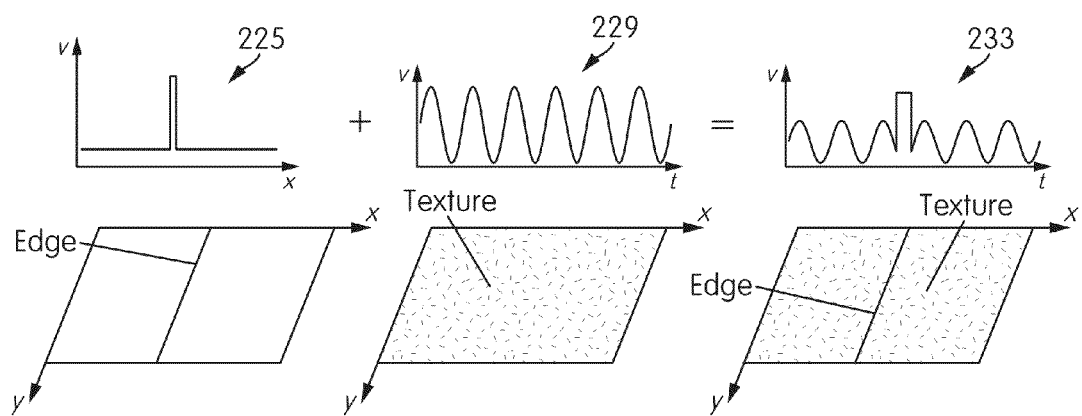

A haptic effect may be created based on a combination of any signals. Signals being combined may have different phases, amplitudes, frequencies, or wave shapes. FIG. 7B illustrates a haptic effect based on a signal 233 that is a combination of a periodic signal (e.g., signal 229 of FIG. 7A) and an impulse signal (e.g., signal 225 of FIG. 5). The haptic effect generated from the combination may simulate both texture, attributable to the periodic haptic drive signal, and an edge or detent, attributable to the impulse signal. In an embodiment, different periodic haptic drive signals may be used on different sides of the edge. The haptic effect generated from the different periodic signals may simulate regions of different texture being separated by the edge. In an embodiment, signals being combined may be based on different inputs. For example, a first haptic drive signal may be based on position of a touch input on surface 110, and may be combined with a second haptic drive signal that is based on position, applied pressure, and contact area of the touch input.

Figure 8A:
FIGS. 8A-8C schematically illustrate the apparatus of FIG. 1A generating a haptic effect with a random or pseudo-random component.

In an embodiment, a haptic effect may be based on a random or pseudo-random haptic drive signal, such as signal 235, illustrated in FIG. 8A. Stochastic effects of the random or pseudo-random signal may add realism to a simulated surface feature. In an embodiment, the random or pseudo-random signal may be used alone in generating a haptic effect. In an embodiment, values of the signal may be confined to a predetermined range. The random or pseudo-random signal may be generated from sampling one or more values of natural phenomena, from a Gabor function, a random number generator, or any other technique.

Figure 8B:
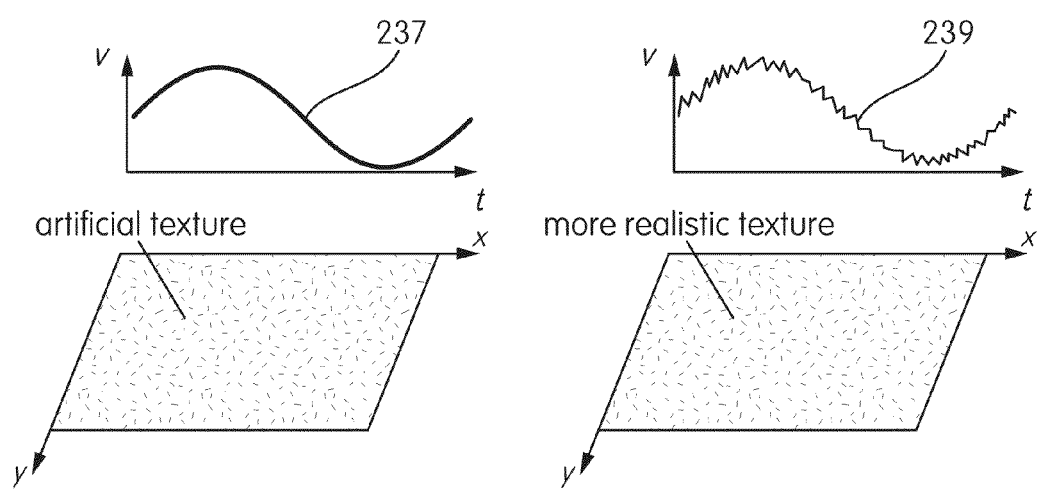

In an embodiment, a haptic effect may be based on a combination of a random or pseudo-random signal and another signal. For example, as illustrated in FIG. 8B, a haptic effect may be based on signal 239, which is a combination of a random or pseudo-random signal and signal 237, which may be a periodic signal.

Figure 8C:
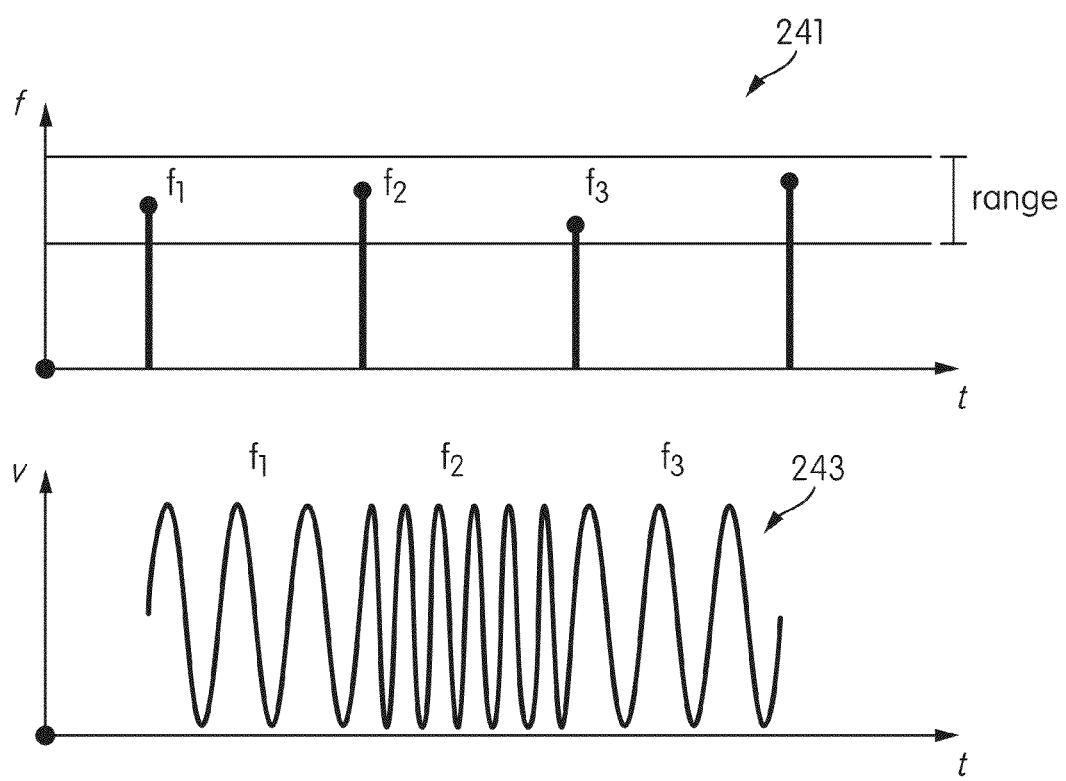

As discussed above, signals may be combined through superposition, modulation, convolution, or any other combination. FIG. 8B illustrates an embodiment in which a random or pseudo-random signal is superimposed on signal 237. FIG. 8C illustrates an embodiment in which a random or pseudo-random signal 241 may frequency modulate a periodic signal. The random or pseudo-random signal 241 in the embodiment may be a discrete signal. In another embodiment, a random or pseudo-random signal may be continuous. In the embodiment in FIG. 8C, a frequency of haptic drive signal 243, on which a haptic effect is based, may be based on a corresponding value of random or pseudo-random signal 241. For example, the frequency of the haptic drive signal 243 may equal a corresponding value of the random or pseudo-random signal 241, or may be adjusted by a value of the random or pseudo-random signal 241.

Figure 9:
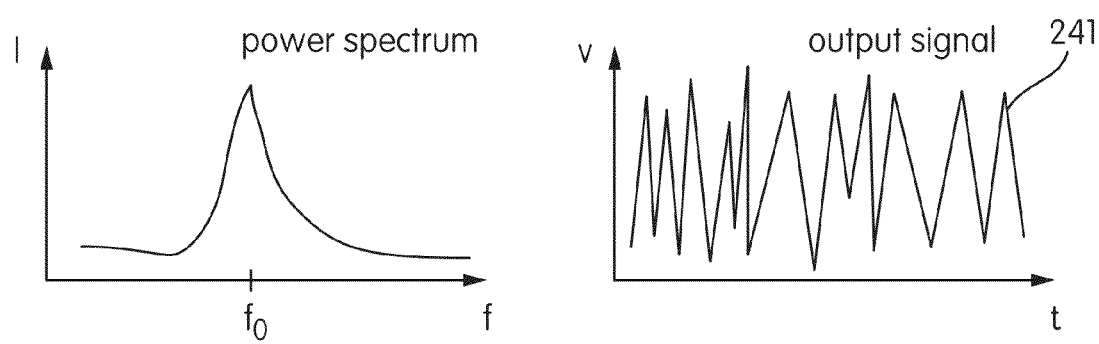
FIG. 9 illustrates a frequency distribution of a random or pseudo-random component of a haptic effect.

In an embodiment, a random or pseudo-random signal may be generated from a desired frequency distribution of the random or pseudo-random signal. For example, FIG. 9 illustrates a power spectrum that defines a distribution of power of a random or pseudo-random signal across a range of frequencies. The random or pseudo-random signal may be generated from the frequency distribution, such as through an inverse Fourier transform or with a time-domain tool. In an embodiment, if a haptic effect is based on a combination of a random or pseudo-random signal with a periodic haptic drive signal, a frequency distribution of the random or pseudo-random signal may be generated to have one or more peaks that match one or more frequencies of the periodic haptic drive signal. For example, the power spectrum of random or pseudo-random signal 241 in FIG. 9 may have a peak at $f_0$ in anticipation of being combined with a periodic signal having a frequency of $f_0$.

As discussed above, a haptic effect may be based on a property of how an object moves across a touch interface, such as surface 110. The property may include location, velocity, acceleration, or any other property of the movement. FIGS. 10A-10B and 11A-11B illustrate generating haptic effects based on location and/or velocity to simulate surface features.

Figure 10A:
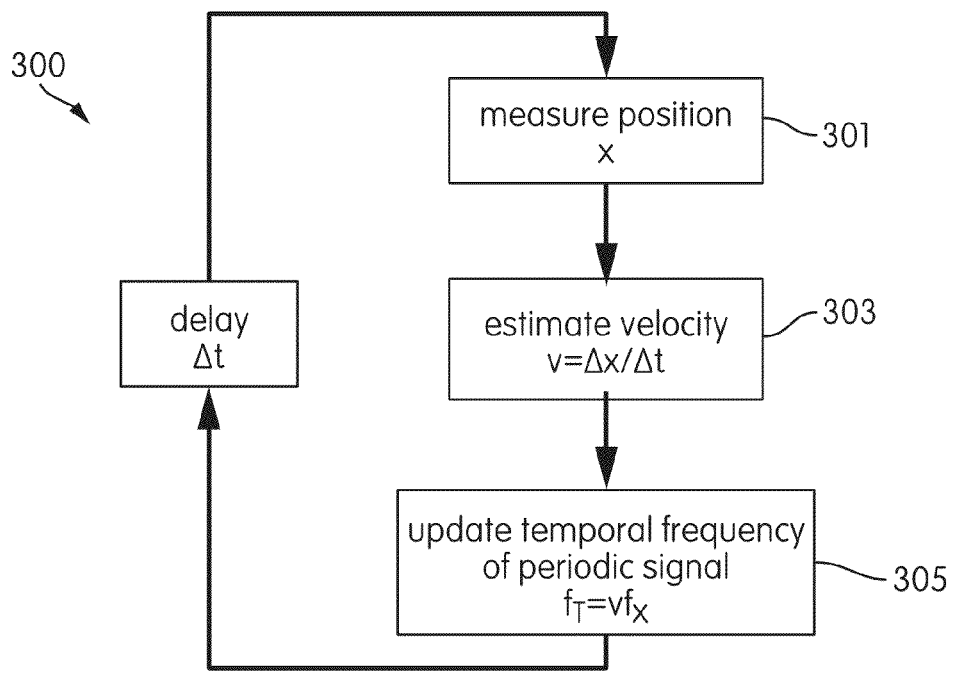
FIGS. 10A-10B illustrate operations for generating a haptic effect based on velocity of a touch input.

FIG. 10A illustrates a method 300 for altering a haptic effect based on velocity of an object moving across a touch interface to simulate a grating or any other surface feature. The grating may be modeled as a series of edges that may be simulated through haptic effects that are based on a series of impulse signals. In the embodiment in FIGS. 10A-10B, the edges in the grating may have equal spacing among them. In another embodiment, the edges may be arbitrarily spaced. Operations of method 300 may adjust timing of the haptic effects so that a surface feature is simulated over a same distance or area of the touch interface regardless of velocity of the object moving across the touch interface.

Figure 10B:
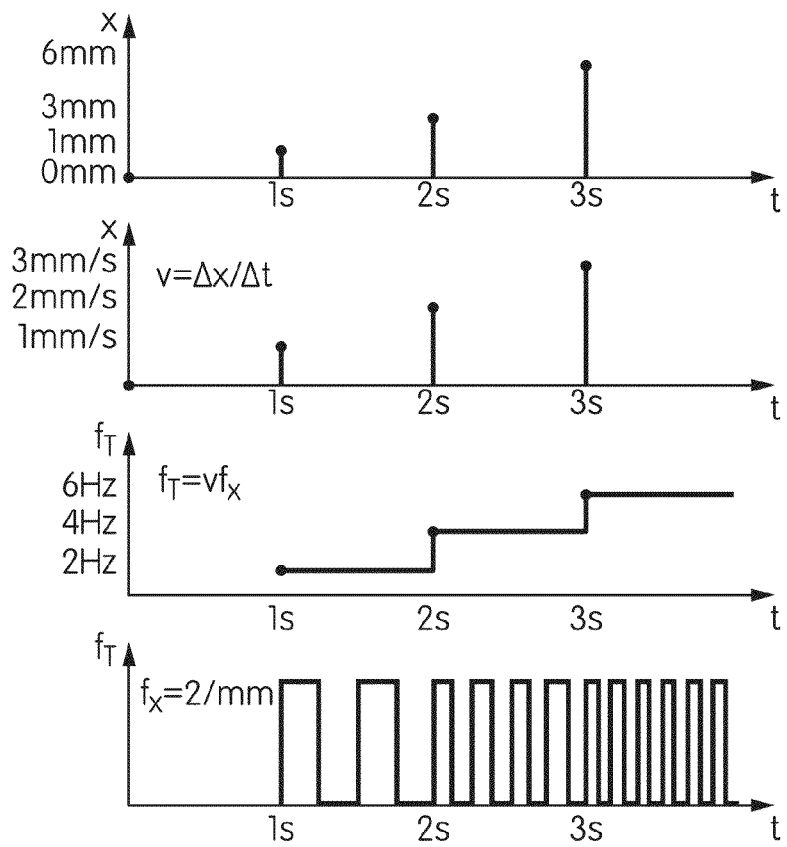

At operation 301, a location or position of an object creating a touch input at a touch interface, such as finger 10 at surface 110, may be measured. In the illustration of FIG. 10B, for example, operation 301 may measure the object to be at 0 mm, 1 mm, 3 mm, and 6 mm locations at a 0-second mark, 1-second mark, 2-second mark, and 3-second mark, respectively.

At operation 303, a velocity of the object may be estimated or otherwise determined. The velocity may be estimated, for example, by dividing a change in location by a change in time. In the illustration in FIG. 10B, for example, operation 303 may estimate velocities of 1 mm/s, 2 mm/sec, and 3 mm/sec at the 1-second mark, 2-second mark, and 3-second mark, respectively.

At operation 305, a haptic effect may be adjusted based on the estimated velocity. For example, to simulate a grating in which edges have equal spacing, impulse signals on which haptic effects are based may have to be compressed in the time domain if velocity of the object increases. If velocity of the object decreases, the impulse signals may be expanded in the time domain. If the series of impulse signals are treated as a periodic square wave, operation 305 may be treated as updating a frequency of the periodic square wave. In the illustration in FIG. 10B, when velocity increases from 1 mm/sec to 2 mm/sec, frequency of the periodic square wave may be increased from 2 Hz to 4 Hz. At each velocity, the haptic effect may simulate two edges of the grating per millimeter $$\left(\text{e.g., } \frac{4 \text{ cycles/sec}}{2 \text{ mm/sec}}\right).$$

When velocity increases from 2 mm/sec to 3 mm/sec, the frequency may be increased from 4 Hz to 6 Hz to still stimulate two edges of the grating per millimeter. In other embodiments where spacing in a grating or any other surface feature is not constant, timing of the haptic effect may still be adjusted in proportion with a change in velocity of a touch input so as to preserve a spatial dimension of the surface feature being simulated.

In the embodiment of FIGS. 10A-10B, because velocity is measured every second instead of continuously, updating of the haptic effect may lag behind change in the velocity. For example, FIG. 10B illustrates that, between the 1-second and 2-second mark, an object creating the touch input traveled 2 mm. The velocity for this interval is thus 2 mm/sec. However, this increased velocity is not measured until the 2-second mark, and the haptic effect is thus not updated until the 2-second mark. As a result, while the object traveled 2 mm between the 1-second and 2-second mark, the haptic effect simulated only two edges, instead of four. Similarly, while the object traveled 3 mm between the 2-second mark and the 3-second mark, the haptic effect simulated only four edges, not six. Thus, because velocity is measured every second, the updated haptic effect lags behind a change in velocity by one second. In an embodiment, the lag may be decreased by decreasing a time between measuring locations and/or velocities of an object at the touch interface. In an embodiment, the lag may be decreased by estimating a future velocity. For example, if velocity is calculated to be 1 mm/sec at the 1-second mark and 2 mm/sec at the 2-second mark, it may be projected that the velocity will increase to 3 mm/sec by the 3-second mark. Then, at the 2-second mark, the increase in velocity to 3 mm/sec may be anticipated by increasing the signal frequency on which the haptic effect is based to 6 Hz.

Figure 11A:
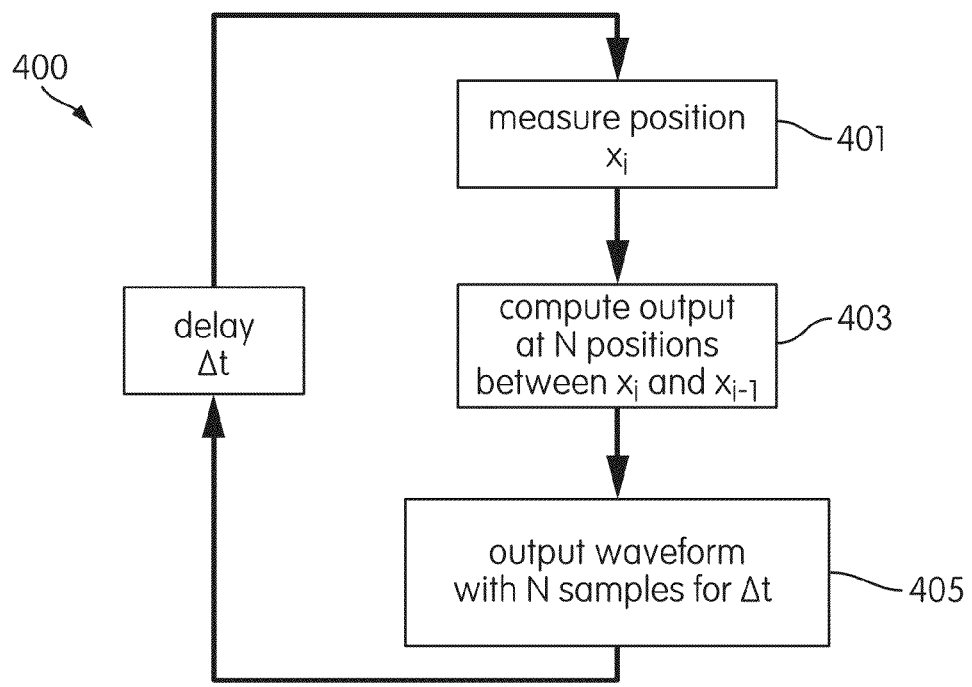
FIGS. 11A-11B illustrate operations for generating a haptic effect based on position of a touch input.
Figure 11B:
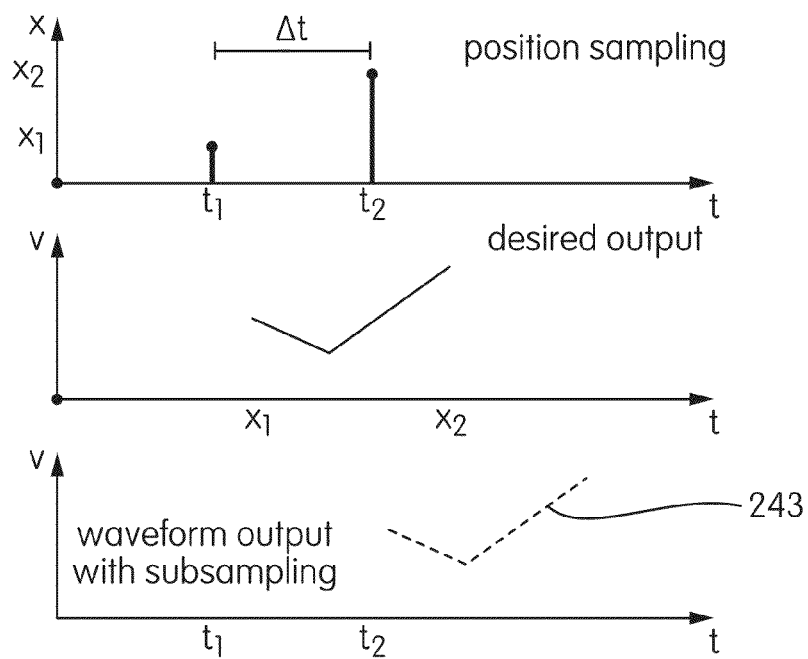

FIGS. 11A-11B illustrate a method 400 for generating a haptic effect based on location of an object moving across a touch interface.

At an operation 401, a location of the object on the touch interface may be determined. For example, FIG. 11B illustrates an example in which the object's location is measured at time $t_1$ to be at $x_1$. Like in the embodiment of FIGS. 10A-10B, the generated haptic effect in FIGS. 11A-11B may similarly lag behind a desired haptic effect. For example, the desired haptic effect for location $x_1$ may depend on a direction taken by the object from location $x_1$, a velocity of the object from location $x_1$, or any combination thereof. Determining the direction or velocity may require a future location of the object to be determined. Because the future location of the object, $x_2$, or the velocity of the object is not known until time $t_2$, after the object has passed location $x_1$, the haptic effect being generated for location $x_1$ may lag behind the object passing the location. The lag may be decreased by decreasing a time between measuring locations of the object at the touch interface.

At time $t_2$, operation 403 may compute output values for a haptic effect based on current location $x_i$ and past location $x_{i-1}$, i.e. on location $x_2$ and location $x_1$. Computing output values may include computing a haptic drive signal for a haptic effect to be generated at or around $t_2$. The drive signal's waveform may have N discrete values corresponding to N positions between $x_i$ and $x_{i-1}$, as illustrated in FIG. 11B, or may be continuous.

At operation 405, the haptic effect based on the waveform computed at operation 403 may be generated. The generated haptic effect may match a desired haptic effect for the interval between $x_i$ and $x_{i-1}$. If the haptic drive signal computed at operation 403 has N discrete values, the haptic effect may be outputted based on one of the values every $\Delta t/N$ seconds, where $\Delta t$ is the time between measurements of an object's location and generating a new haptic effect. FIG. 11B illustrates the lag between signal 243 and the desired haptic drive signal. As discussed above, while a haptic effect based on the signal is desired for the interval between $x_1$ and $x_2$, it is not generated until after an object has passed $x_2$. As discussed above, the lag may be decreased by decreasing a time between measuring locations of the object at the touch interface.

Figure 12:
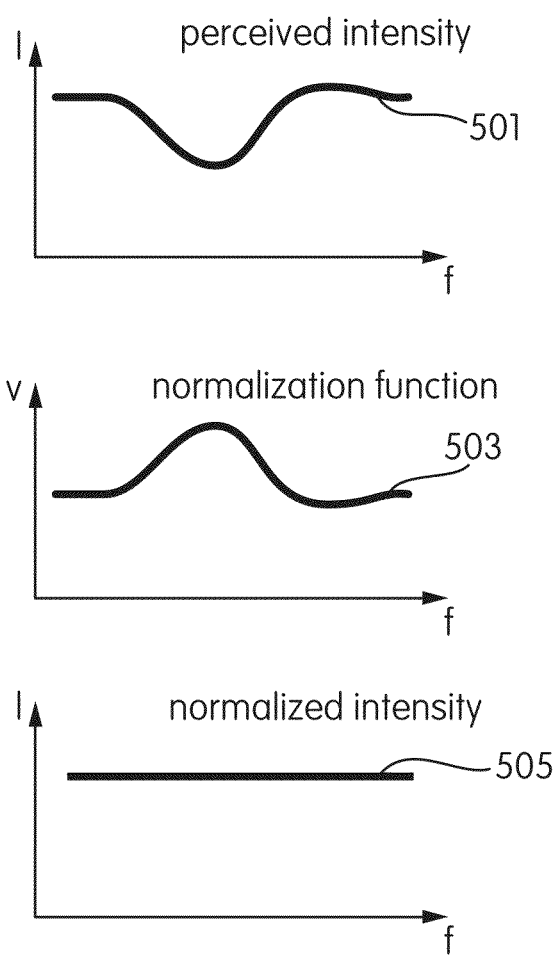
FIG. 12 illustrates a function for normalizing perceived intensity of a haptic effect.

In an embodiment, intensity of a haptic effect may be normalized. Normalization may address, for example, periodic haptic effects that are perceived to have different intensities at different frequencies or at different contact properties (e.g., different touch input velocities, applied pressures, finger moisture levels). FIG. 12 illustrates perceived intensity values 501 as a function of frequency. A periodic haptic effect having one frequency may be perceived more easily than a haptic effect having a different frequency, even if both haptic effects have the same actual intensity. A normalization function 503, such as that illustrated in FIG. 12, may normalize perceived intensity across a range of frequencies. A periodic haptic effect may normalize its perceived intensity by, for example, multiplying its amplitude by a value of the normalization function that corresponds to a frequency of the periodic haptic effect. In an embodiment, the normalization function 503 may be an inverse (e.g., additive or multiplicative inverse) of the perceived intensity function 501. Example normalized intensity values 505 are illustrated in FIG. 12.

In an embodiment, a haptic effect generated for an electronic user interface device may depend on a history of interactions with the electronic user interface device. For example, the haptic effect may depend on a combination of a previous touch input and a current touch input. The previous touch input may have caused one haptic effect to be generated, while the current touch input may, for instance, cause a different haptic effect to be generated. In an embodiment, a haptic effect may be suspended for a predetermined period of time after a touch input has been detected.

One or more operations of the one or more methods disclosed herein may be implemented as one or more instructions stored on a computer-readable medium and executed by one or more processors. For example, the one or more operations may be implemented through firmware or software code stored on RAM, ROM, EPROM, flash memory, a hard drive, or any other computer-readable medium.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of producing a haptic effect, comprising:
 generating a periodic drive signal based on a touch input at a surface of an interface device and based on a texture to be simulated at the surface, the texture comprising a grating or mesh texture, the grating including a plurality of edges; and
 applying the periodic drive signal to a haptic output device coupled to the surface; and
 altering a frequency of the periodic drive signal based on spacing among the plurality of edges of the grating or mesh texture and based on a velocity of the touch input at the surface.

2. The method of claim 1, wherein the haptic output device is configured to generate electrostatic friction, and wherein said generating the periodic drive signal comprises altering an amplitude, frequency, or wave shape of the periodic drive signal to alter a level of friction at the surface of the interface device, said altering based on a location, velocity, acceleration, pressure, or contact area of the touch input.

3. The method of claim 2, wherein said generating the periodic drive signal comprises altering the amplitude, frequency, or wave shape of the periodic drive signal based on a simulated transition between a first simulated region represented on the surface of the interface device and a second simulated region represented on the surface of the interface device.

4. The method of claim 3, wherein the simulated transition comprises movement over a simulated edge of the first simulated region or of the second simulated region, and wherein the amplitude, frequency, or wave shape is altered when the location of the touch input is substantially at the edge.

5. The method of claim 2, wherein said generating the periodic drive signal comprises altering the frequency or the amplitude of the periodic drive signal by a pseudo-random amount.

6. The method of claim 2, wherein the periodic drive signal is a first periodic drive signal, the method further comprising generating a second periodic drive signal and applying the second periodic drive signal to the haptic output device, wherein the first periodic drive signal has a different frequency than the second periodic drive signal.

7. The method of claim 1, wherein the texture comprises a stick-slip texture at the surface of the interface device, and wherein said generating the periodic drive signal comprises temporarily suspending the periodic drive signal to simulate a slippery texture at the surface of the interface device.

8. The method of claim 1, further comprising receiving recorded contact dynamics of an object that moved across another surface, wherein said generating the periodic drive signal is based on the recorded contact dynamics.

9. An interface device comprising:
 a haptic output device coupled to a surface of the interface device;
 a drive module configured to generate a periodic drive signal based on a touch input at the surface and based on a texture to be simulated at the surface, the texture comprising a grating or mesh texture, the grating including a plurality of edges, the drive module further configured to alter a frequency of the periodic drive signal based on spacing among the plurality of edges of the grating or mesh and based on a velocity of the touch input at the surface; and
 a drive circuit operatively coupled to the drive module and the haptic output device and configured to apply the periodic drive signal to the haptic output device.

10. The device of claim 9, wherein the haptic output device is configured to generate electrostatic friction, and wherein the drive module is further configured to generate the periodic drive signal by altering an amplitude, frequency, or wave shape of the periodic drive signal to alter a level of friction at the surface of the interface device and based on a location, velocity, acceleration, pressure, or contact area of the touch input.

11. The device of claim 10, wherein the drive module is further configured to generate the periodic drive signal by altering the amplitude, frequency, or wave shape of the periodic drive signal based on a simulated transition between a first simulated region represented on the surface of the interface device and a second simulated region represented on the surface of the interface device.

12. The device of claim 11, wherein the simulated transition comprises movement over a simulated edge of the first simulated region or of the second simulated region, and wherein the drive module is further configured to alter the amplitude, frequency, or wave shape of the periodic drive signal when the location of the touch input is substantially at the edge.

13. The device of claim 10, wherein the drive module is further configured to generate the periodic drive signal by altering the frequency or the amplitude of the periodic drive signal by a pseudo-random amount.

14. The device of claim 9, wherein the texture comprises a stick-slip texture at the surface of the interface device, and wherein the drive module is further configured to generate the periodic drive signal by temporarily suspending the periodic drive signal to simulate a slippery texture at the surface of the interface device.

15. The device of claim 9, wherein the periodic drive signal is a first periodic drive signal, wherein the drive module is further configured to generate a second periodic drive signal having a different frequency than the first periodic drive signal, and wherein the drive circuit is configured to apply the second drive signal to the haptic output device.

16. The device of claim 9, wherein the drive module is further configured to receive recorded contact dynamics of an object that moved across another surface, and is configured to generate the periodic drive signal based on the recorded contact dynamics.

* * * * *